(12) United States Patent
Xu et al.

(10) Patent No.: US 11,359,659 B2
(45) Date of Patent: Jun. 14, 2022

(54) LOCKING DEVICE

(71) Applicant: BEIJING SURGERII TECHNOLOGY CO., LTD., Beijing (CN)

(72) Inventors: Kai Xu, Beijing (CN); Tianlai Dong, Beijing (CN); Zhengchen Dai, Beijing (CN); Jiangran Zhao, Beijing (CN); Zhixiong Yang, Beijing (CN); Bo Liang, Beijing (CN)

(73) Assignee: BEIJING SURGERII TECHNOLOGY CO., LTD., Beijing (CN)

( * ) Notice: Subject to any disclaimer, the term of this patent is extended or adjusted under 35 U.S.C. 154(b) by 322 days.

(21) Appl. No.: 16/329,238

(22) PCT Filed: Aug. 30, 2017

(86) PCT No.: PCT/CN2017/099753
§ 371 (c)(1),
(2) Date: Feb. 28, 2019

(87) PCT Pub. No.: WO2018/041157
PCT Pub. Date: Mar. 8, 2018

(65) Prior Publication Data
US 2019/0249704 A1 Aug. 15, 2019

(30) Foreign Application Priority Data
Aug. 31, 2016 (CN) .......................... 201610797613.1

(51) Int. Cl.
*F16B 7/04* (2006.01)
*F16B 2/06* (2006.01)

(52) U.S. Cl.
CPC ............ *F16B 7/0433* (2013.01); *F16B 2/065* (2013.01); *Y10T 403/7141* (2015.01); *Y10T 403/7171* (2015.01)

(58) Field of Classification Search
CPC ........ F16B 7/0433; F16B 2/065; F16G 11/02; F16G 11/04; F16G 11/10; E05B 73/0035;
(Continued)

(56) References Cited

U.S. PATENT DOCUMENTS 1,410,804 A * 3/1922 Gosnell ................... F16G 11/14
403/218
2,021,515 A * 11/1935 Matteo ..................... B60M 1/24
191/43

(Continued)

FOREIGN PATENT DOCUMENTS

CN    1029147 C  6/1995
CN   202560729 U  11/2012
(Continued)

*Primary Examiner* — Amber R Anderson
*Assistant Examiner* — Kevin J Baynes
(74) *Attorney, Agent, or Firm* — SZDC Law P.C.

(57) ABSTRACT

Disclosed is a locking device, comprising an outer sleeve (1) and at least one locking unit (2) located in the outer sleeve (1), wherein the locking unit (2) is formed by connecting a plurality of pressing blocks (3), a gap (5) is provided between two adjacent ones of pressing blocks (3), a rod locking hole (6) is provided in the gap (5), and a set screw hole (7) is provided on the outer sleeve (1) at a position corresponding to the locking unit (2); and when a set screw is screwed into the set screw hole (7) to directly or indirectly press the locking unit (2), the locking unit (2) deforms and drives the pressing blocks (3) to tightly press rods (8, 9) mounted in the respective rod locking holes (6) at the same time.

9 Claims, 3 Drawing Sheets

(58) Field of Classification Search
CPC .. E05B 73/0041; E05B 73/02; Y10T 24/3967; Y10T 24/3958; Y10T 24/3978; Y10T 403/32032; Y10T 403/348; Y10T 403/57; Y10T 403/5706; Y10T 403/5741; Y10T 403/5766; Y10T 403/5786; Y10T 403/5793; Y10T 403/7041; Y10T 403/7129; Y10T 403/7141; Y10T 403/7171; Y10T 403/7176; Y10T 403/7182; A61B 1/005; F16L 3/1058; F16L 3/1075; F16L 3/1083; F16L 3/1091; F16L 3/105; F16L 3/22

See application file for complete search history.

(56) References Cited

U.S. PATENT DOCUMENTS

| | | | | |
|---|---|---|---|---|
| 2,888,546 | A * | 5/1959 | Kinney | H05B 3/80 392/441 |
| 2,988,794 | A * | 6/1961 | Gutt | E04C 5/125 403/177 |
| 3,123,879 | A * | 3/1964 | Boduroff et al. | E04C 5/122 403/217 |
| 3,522,682 | A * | 8/1970 | Annex | E04C 5/122 52/223.13 |
| 3,531,071 | A * | 9/1970 | Kubli | F16L 3/2235 248/68.1 |
| 3,613,179 | A * | 10/1971 | Whittaker | F16G 11/02 24/302 |
| 3,659,321 | A * | 5/1972 | Laurent | E04C 5/122 403/369 |
| 3,957,381 | A | 5/1976 | Schafer | |
| 4,043,685 | A | 8/1977 | Hyams | |
| 4,046,390 | A * | 9/1977 | Dunham | B23B 31/202 279/46.8 |
| 4,715,571 | A * | 12/1987 | Soltow | F16L 3/22 174/146 |
| 5,027,478 | A * | 7/1991 | Suhr | F16L 3/223 24/16 R |
| 5,184,794 | A * | 2/1993 | Saito | F16L 3/13 248/316.5 |
| 5,377,939 | A * | 1/1995 | Kirma | F16B 7/048 24/543 |
| 5,678,348 | A * | 10/1997 | Zielinski | A01K 97/08 43/26 |
| 5,742,982 | A * | 4/1998 | Dodd | F16G 11/00 24/16 R |
| 5,996,945 | A * | 12/1999 | Coles | F16L 3/2235 24/16 R |
| 6,353,186 | B1 * | 3/2002 | Dams | H02G 15/013 174/667 |
| 6,426,462 | B1 * | 7/2002 | Mignon | G02B 6/4451 138/150 |
| 6,487,757 | B1 * | 12/2002 | Stabler | E01D 19/14 24/115 M |
| 6,552,270 | B1 * | 4/2003 | Heacox | F16L 3/233 174/135 |
| 6,578,800 | B2 * | 6/2003 | Stefan | B25J 19/0025 248/52 |
| 7,861,734 | B2 * | 1/2011 | Ma | F16G 11/103 135/28 |
| 7,997,923 | B1 * | 8/2011 | Oh | H01R 13/562 439/446 |
| 8,344,246 | B2 * | 1/2013 | Lipiansky | H02G 3/32 174/27 |
| 8,873,926 | B2 * | 10/2014 | Beamon | G02B 6/4248 385/136 |
| 9,028,397 | B2 * | 5/2015 | Naito | A61B 17/29 600/150 |
| 9,106,068 | B2 * | 8/2015 | Barna | H02G 3/32 |
| 9,157,504 | B2 * | 10/2015 | Watanabe | F16G 11/042 |
| 9,425,599 | B2 * | 8/2016 | Hutchinson | F16L 3/137 |
| 9,534,708 | B2 * | 1/2017 | Cripps, II | F16L 3/22 |
| 9,951,888 | B2 * | 4/2018 | Boriack | A01C 7/208 |
| 2005/0260895 | A1 * | 11/2005 | Aoshima | F16B 7/0433 439/752 |
| 2007/0079969 | A1 * | 4/2007 | Allenworth | F16L 3/22 166/368 |
| 2007/0120023 | A1 * | 5/2007 | Martinez | F16L 3/22 248/75 |
| 2007/0246613 | A1 * | 10/2007 | Kennedy | H02G 3/32 248/56 |

FOREIGN PATENT DOCUMENTS

| | | | | |
|---|---|---|---|---|
| CN | 203161744 U | | 8/2013 | |
| CN | 204828164 U | | 12/2015 | |
| CN | 205166763 U | | 4/2016 | |
| CN | 106286530 A | | 1/2017 | |
| FR | 2280013 A1 | * | 2/1976 | ............ F16B 7/0433 |
| FR | 2624927 A1 | * | 6/1989 | ............ H02G 1/10 |
| GB | 929877 A | | 6/1963 | |
| JP | 2007162790 A | | 6/2007 | |
| JP | 2013204762 A | | 10/2013 | |
| WO | 2006011031 A1 | | 2/2006 | |

\* cited by examiner

LOCKING DEVICE

CROSS REFERENCE TO RELATED APPLICATIONS

This patent application is the National Stage Application of PCT/CN2017/099753, filed on Aug. 30, 2017, which claims the priority of Chinese patent application No. 201610797613.1 filed on Aug. 31, 2016, entitled "Locking device for multiple rods", which is incorporated herein by reference in its entirety.

TECHNICAL FIELD

The present invention relates to a locking device capable of locking multiple rods at the same time.

BACKGROUND ART

Mechanical fixing mechanisms for rods are widely used in the mechanical field. Purly flexible cables, metal wires are mostly fixed by means of knotting. Rods with a certain stiffness are mostly fixed by means of pressing, such as a set screw or a pressing plate. In the currently common method, multiple rods of different thicknesses can only be separately fixed, and cannot be fixed in a small space at the same time.

SUMMARY OF THE INVENTION

Aiming at the above problems, an object of the present invention is to provide a locking device for multiple rods that can fix multiple rods of different sizes at the same time, and in particular can realize connection and fixation in a small space.

In order to achieve the above object, following technical solution is used in the present invention: a locking device, comprising an outer sleeve and at least one locking unit located in the outer sleeve, wherein the locking unit is formed by connecting a plurality of pressing blocks, with a gap between two adjacent ones of the pressing blocks, a rod locking hole is provided in the gap, and a set screw hole is provided on the outer sleeve at a position corresponding to the locking unit; and when a set screw is screwed into the set screw hole to directly or indirectly press the locking unit, the locking unit deforms and drives the pressing blocks to tightly press rods mounted in the respective rod locking holes at the same time.

In a preferred embodiment, the pressing blocks are distributed in sequence, and every two adjacent ones of pressing blocks are connected by a deformable connecting part at one or two ends thereof; and the set screw hole is directly opposite to the pressing block on the outermost side.

In a preferred embodiment, the connecting part is of a U-shaped structure.

In a preferred embodiment, the rod locking holes are divided into multiple groups according to the difference in size, the size of the rod locking holes distributed in the same gap is the same, and the number of the rod locking holes in each gap is one or more.

In a preferred embodiment, the rod locking holes are divided into two groups, with one group being thick rod locking holes, and the other group being thin rod locking holes.

In a preferred embodiment, the locking unit is in the shape of a fan, the pressing blocks are distributed in the circumferential direction of the outer sleeve and roots of the pressing blocks are securely connected to each other, a sharp groove is provided on the pressing block in the middle, the tip of the sharp groove points to the center of the fan, and an inner wall of the outer sleeve is provided with a wedge block to be inserted into the sharp groove; a trapezoidal ejector block is also provided in the outer sleeve, and the trapezoidal ejector block is located between two pressing blocks on the outermost side of the locking unit; and the set screw hole is directly opposite to the trapezoidal ejector block.

In a preferred embodiment, the rod locking holes are divided into multiple groups according to the difference in size, the size of the rod locking holes distributed in the same gap is the same, and the number of the rod locking holes in each gap is one or more.

In a preferred embodiment, a second locking hole is provided between an upper surface of the trapezoidal ejector block and the locking unit.

In a preferred embodiment, two smooth shaft passage holes are provided on the outer sleeve.

In a preferred embodiment, when two or more of the locking units are provided, the locking units are sequentially arranged in the outer sleeve in the axial direction of the outer sleeve.

The present invention also provide a locking device, comprising an outer sleeve and at least one locking unit located in the outer sleeve, wherein the locking unit is formed by connecting a plurality of pressing blocks, with a gap between two adjacent ones of pressing blocks, a rod locking hole is provided in the gap, and a fastening hole is provided on the outer sleeve at a position corresponding to the locking unit; and when a fastener is screwed into the fastening hole to directly or indirectly press the locking unit, the locking unit deforms and drives the pressing blocks to tightly press rods mounted in the respective rod locking holes at the same time. The present invention adopts the above technical solutions, and has the following advantages:
1. In the present invention, the outer sleeve is internally provided with a locking unit, which is formed by pressing blocks in the form of a deformable structure, a gap is provided between the pressing blocks, and rod locking holes of different sizes can be arranged in the gap, so when a set screw is screwed into an outer sleeve through a set screw hole, the set screw presses the locking unit such that same deforms, thereby the gap between the pressing blocks becomes narrow, to thus further tightly press rods mounted in the rod locking holes, and therefore, when the multiple rods of different sizes are respectively mounted in the rod locking holes, the multiple rods are fixed together at the same time. 2. In the present invention, the structure of the locking unit makes the pressing force transmitted on each pressing block consistent, such that the pressing force of each rod of the same size is the same, which ensures the locking effect at the same time. 3. In the present invention, the loading and unloading of the locking force are realized by screwing and unscrewing of the set screw in the set screw hole, and when the set screw is unscrewed, all the rods can slide freely to adjust the position and length, or to be replaced, making the use more flexible. 4. In the present invention, two smooth shaft passage holes for smooth shafts to pass through are provided on the outer sleeve, and therefore, where one rod is used to push and pull the remaining multiple rods via a locking device to perform a linear motion, and since the support of the smooth shafts makes the locking unit not overturn, the linear motion can be performed and maintained stably.

DETAILED DESCRIPTION OF EMBODIMENTS

The present invention is described in detail below in conjunction with the accompanying drawings and embodiments.

Embodiment I

Figure 1:
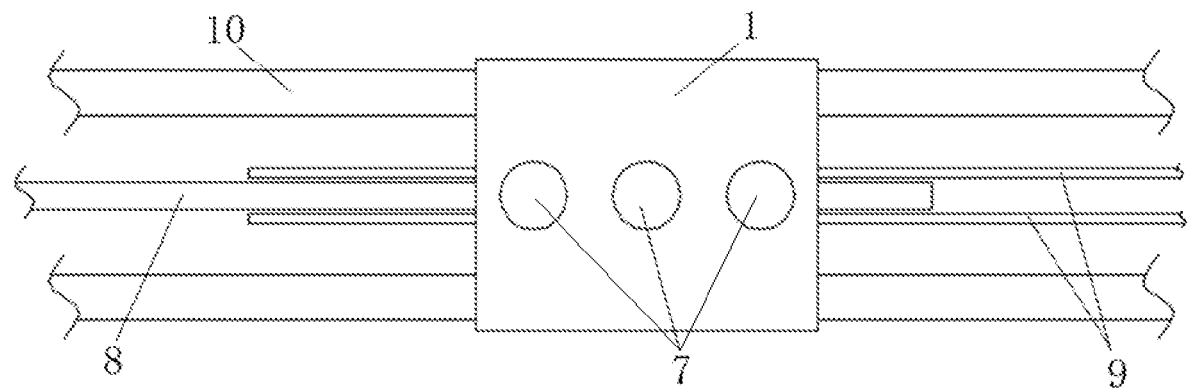
FIG. 1 is a schematic diagram of the present invention in an application state.
Figure 2:
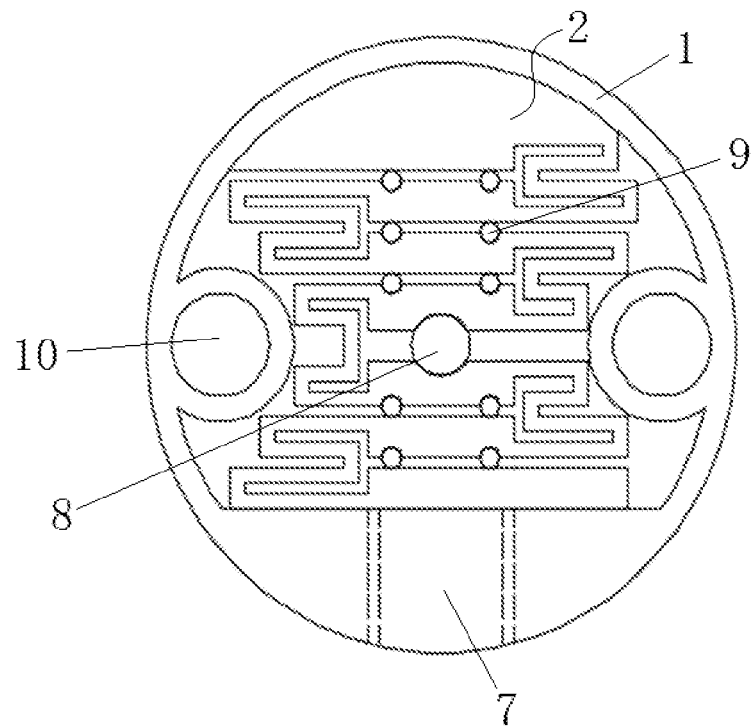
FIG. 2 is a structural schematic diagram of Embodiment I of the present invention.
Figure 3:
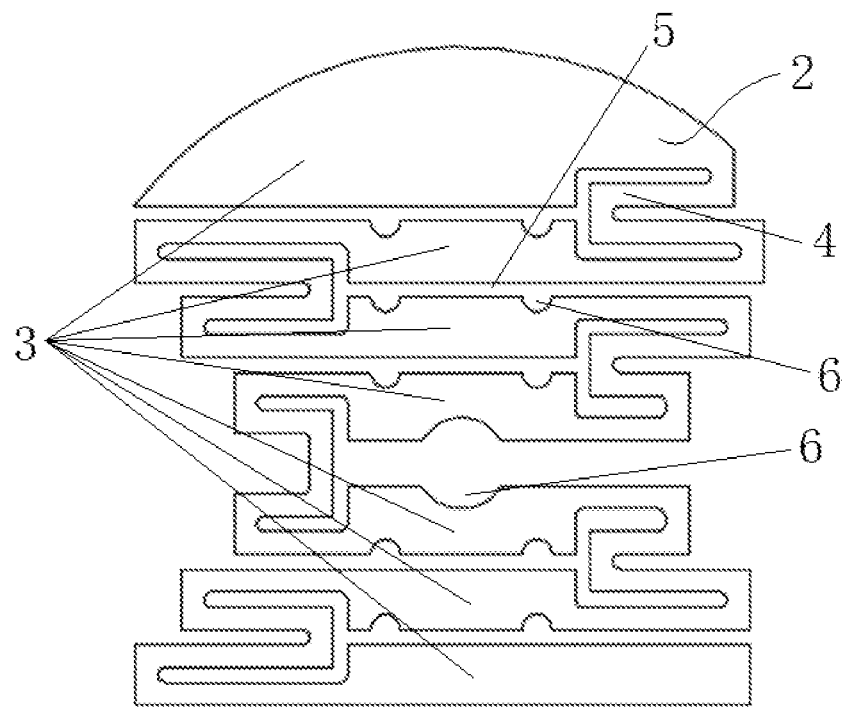
FIG. 3 is a structural schematic diagram of a locking unit of Embodiment I.

As shown in FIGS. 1-3, this embodiment comprises an outer sleeve 1 and at least one locking unit 2 located in the outer sleeve 1, and when two or more locking units 2 are provided, the locking units 2 are sequentially arranged in an axial direction of the outer sleeve 1. The locking unit 2 is formed by connecting a plurality of pressing blocks 3 arranged in sequence, every two adjacent ones of pressing blocks 3 are connected by a connecting part 4 at one or two ends thereof, with a gap 5 between two adjacent ones of pressing blocks 3, and a rod locking hole 6 is provided in the gap 5. A set screw hole 7 is provided on the outer sleeve 1 at a position corresponding to the locking unit 2, and the set screw hole 7 is directly opposite to the pressing block 3 on the outermost side of the locking unit 2. When a set screw is screwed into the set screw hole 7 to press the locking unit 2, the locking unit 2 deforms and drives the pressing blocks 3 to tightly press rods 8, 9 mounted in the respective locking holes 6, and at this time the rods 8, 9 are in a locked state. On the contrary, when the set screw is rotated in the opposite direction, the locking unit 2 returns to the state before deformation, and at this time the rods 8, 9 can freely slide in the rod locking holes 6, and the rods 8, 9 are in an unlocked state.

Further, the connecting part 4 can use any structure which is easy to deform, such as a U-shaped structure, so that the locking unit 2 has relatively strong local deformation capability, and in the unlocked state, the gaps 5 between the pressing blocks 3 can be passively increased, thus being convenient to adjust and replace the rods 8, 9; and in the locked state, the connecting part 4 can be easily deformed, so that the gaps 5 between the pressing blocks 3 become narrow, thereby tightly pressing the rods 8, 9.

Further, a plurality of rod locking holes 6 are provided and can be divided into multiple groups according to the difference in size of the holes, and the size of the rod locking holes 6 distributed in the same gap 5 is the same. For example, in an application (as shown in FIG. 2), the rod locking holes 6 are divided into two groups, one group of rod locking holes 6 are thick rod locking holes, which can be located in the gaps 5 between any two pressing blocks 3 and are used to lock relatively thick rods 8, and the remaining rod locking holes 6 are thin rod locking holes, which are evenly distributed in gaps 5 except for the gaps where the thick rod locking holes are located and which are used to lock relatively thin rods 9. In the locked state, pushing and pulling the relatively thick rods 8 can drive the relatively thin rods 9 to move together, and then output the driving force through the relatively thin rods 9. The thin rod locking holes may or may not be distributed in a centrosymmetric manner about the thick rod locking holes, but in the latter case when there is a load, the locking unit 2 will have a torque that will tip over in the horizontal direction.

Further, the number of the thin rod locking holes in the respective gaps 5 shall be consistent, and is one or more, preferably one or two.

Further, the outer sleeve 1 is provided with two smooth shaft passage holes for smooth shafts 10 to pass through, and under the support of the smooth shafts 10, the locking unit 2 does not tip over, so that in the above application, the relatively thick rods 8 can drive the relatively thin rods 9 to stably perform a linear motion.

Embodiment II

Figure 4:
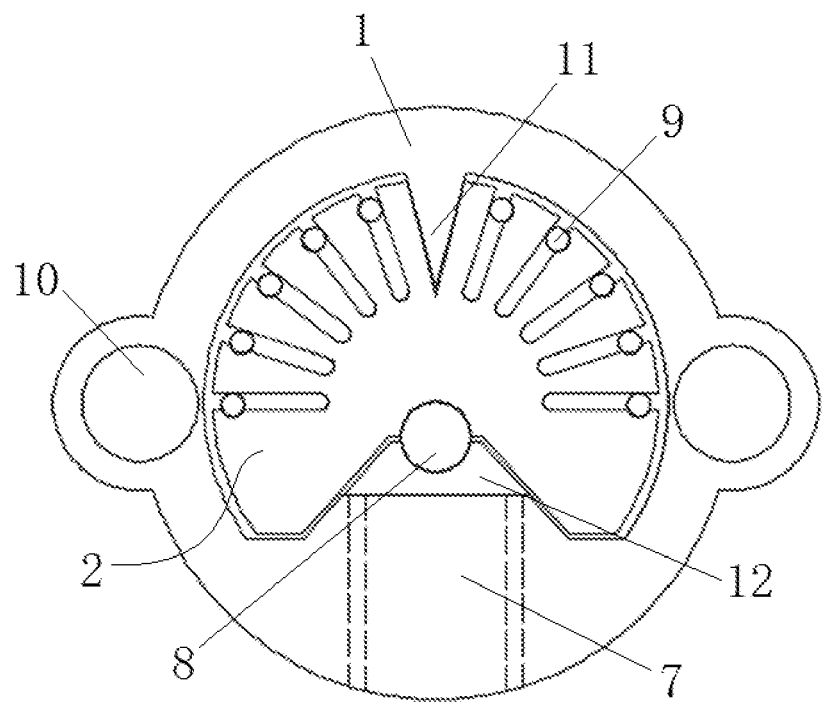
FIG. 4 is a structural schematic diagram of Embodiment II of present invention.
Figure 5:
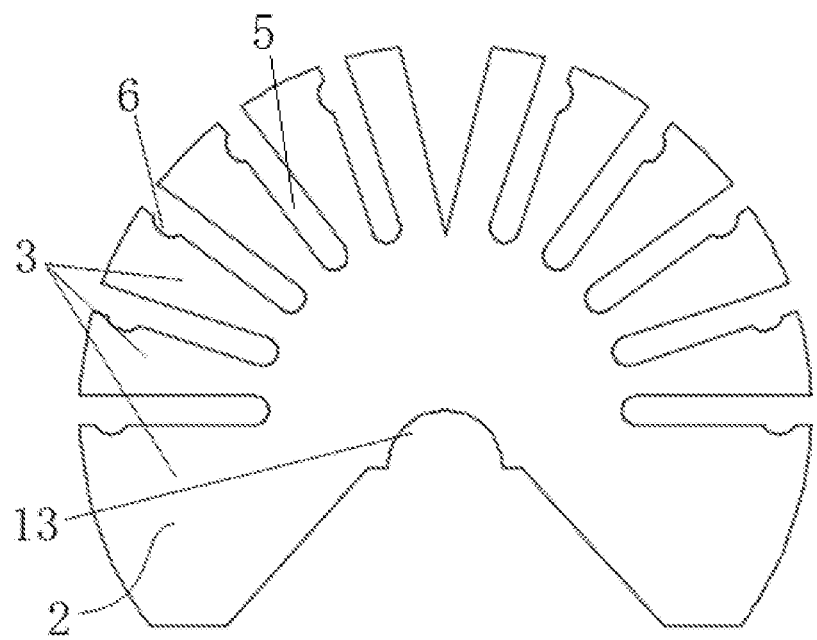
FIG. 5 is a structural schematic diagram of a locking unit of Embodiment II.

As shown in FIG. 4 and FIG. 5, this embodiment comprises an outer sleeve 1 and at least one locking unit 2 located in the outer sleeve 1, and when two or more locking units 2 are provided, the locking units 2 are sequentially arranged in an axial direction of the outer sleeve 1. The locking unit 2 is formed by connecting a plurality of pressing blocks 3, the locking unit 2 is in the shape of a fan, the pressing blocks 3 are distributed in the circumferential direction of the outer sleeve 1, and the roots of the pressing blocks 3 are securely connected to each other. A gap 5 is provided between two adjacent ones of pressing blocks 3, and a rod locking hole 6 is provided in the gap 5. A sharp groove is provided on the pressing block 3 in the middle, the tip of the sharp groove points to the center of the fan, and an inner wall of the outer sleeve 1 is provided with a wedge block 11 to be inserted into the sharp groove. A trapezoidal ejector block 12 is also provided in the outer sleeve 1, and the trapezoidal ejector block 12 is located between two pressing blocks 3 on the outermost side of the locking unit 2. A set screw hole 7 is provided on the outer sleeve 1 at a position corresponding to the trapezoidal ejector block 12. When a set screw is screwed into the set screw hole 7, the set screw presses the locking unit 2 via the trapezoidal ejector block 12, the opening angle of the sharp groove on the pressing block 3 becomes larger under the action of the wedge block 11, so that the locking unit is locally deformed, that is, the pressing blocks 3 move in the circumferential direction and press the rods 9 mounted in the rod locking holes 6.

Further, a plurality of rod locking holes 6 are provided and can be divided into multiple groups according to the difference in size of the holes, and the size of the rod locking holes 6 distributed in the same gap 5 is the same.

Figure 6:
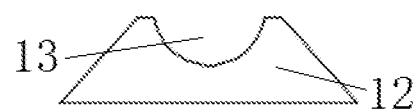
FIG. 6 is a structural schematic diagram of a trapezoidal ejector block in Embodiment II.

Further, as shown in FIG. 5 and FIG. 6, a second rod locking hole 13 is also provided between an upper surface of the trapezoidal ejector block 12 and the locking unit 2, and in an application, the second rod locking hole is a thick rod locking hole for locking a relatively thick hole 8; and the rod locking 6 holes distributed in various gaps 5 are thin rod locking holes for locking relatively thin rods 9.

Further, the number of the rod locking holes 6 in the respective gaps 5 shall be consistent, and is one or more, preferably one or two.

Further, the outer sleeve 1 is provided with two smooth shaft passage holes for smooth shafts 10 to pass through, and under the support of the smooth shafts 10, the locking unit 2 does not tip over, so that in the above application, the relatively thick rods 8 can drive the relatively thin rods 9 to stably perform a linear motion.

The present invention has been illustrated only by the above embodiments, and the structure, arrangement position and connection of the components can be varied. On the basis of the technical solutions of the present invention, the improvements or equivalent changes to individual components according to the principles of the present invention should not be excluded from the scope of protection of the present invention.

The invention claimed is:

1. A locking device, comprising:
    at least one locking unit, the locking unit comprising a plurality of pressing blocks connected together, at least one gap between adjacent pressing blocks, and at least one first rod locking hole in the at least one gap;
    an outer sleeve configured to accommodate the at least one locking unit, the outer sleeve comprising a locking part hole; and
    a locking part disposed in the locking part hole, an end of the locking part being configured to touch and press at least one of the plurality of pressing blocks of the at least one locking unit to press the plurality of pressing blocks against the interior side of the outer sleeve to change a size of the at least one first rod locking hole,
    wherein the plurality of pressing blocks are distributed in a shape of a fan; the locking unit further comprises a sharp groove in middle of the fan and having a tip pointing to a center of the fan, and the locking device further comprises a wedge block accommodated in the sharp groove.

2. The locking device of claim 1, wherein roots of the plurality of pressing blocks are fixedly connected or integrally formed with each other.

3. The locking device of claim 1, wherein the locking part further comprises an ejector block disposed between outermost sides of the locking unit, and is configured to touch and press the plurality of pressing blocks.

4. The locking device of claim 3, wherein the locking unit further comprises a second rod locking hole formed at an interface of the ejector block and the locking unit.

5. The locking device of claim 4, the ejector block is a trapezoidal structure.

6. The locking device of claim 1, wherein the at least one first rod locking hole in each gap comprises a plurality of first rod locking holes in the same gap, and wherein the plurality of the first rod locking holes have the same size.

7. The locking device of claim 1, wherein the locking part comprises a set screw configured to be screwed into the locking part hole to press the plurality of pressing blocks.

8. The locking device of claim 1, wherein the at least one locking unit comprises a plurality of locking units, and wherein the plurality of the locking units are sequentially distributed along an axial direction of the outer sleeve.

9. The locking device of claim 1, further comprising at least one smooth shaft passage hole provided along an axial direction of the outer sleeve.

* * * * *